United States Patent Office 3,324,221
Patented June 6, 1967

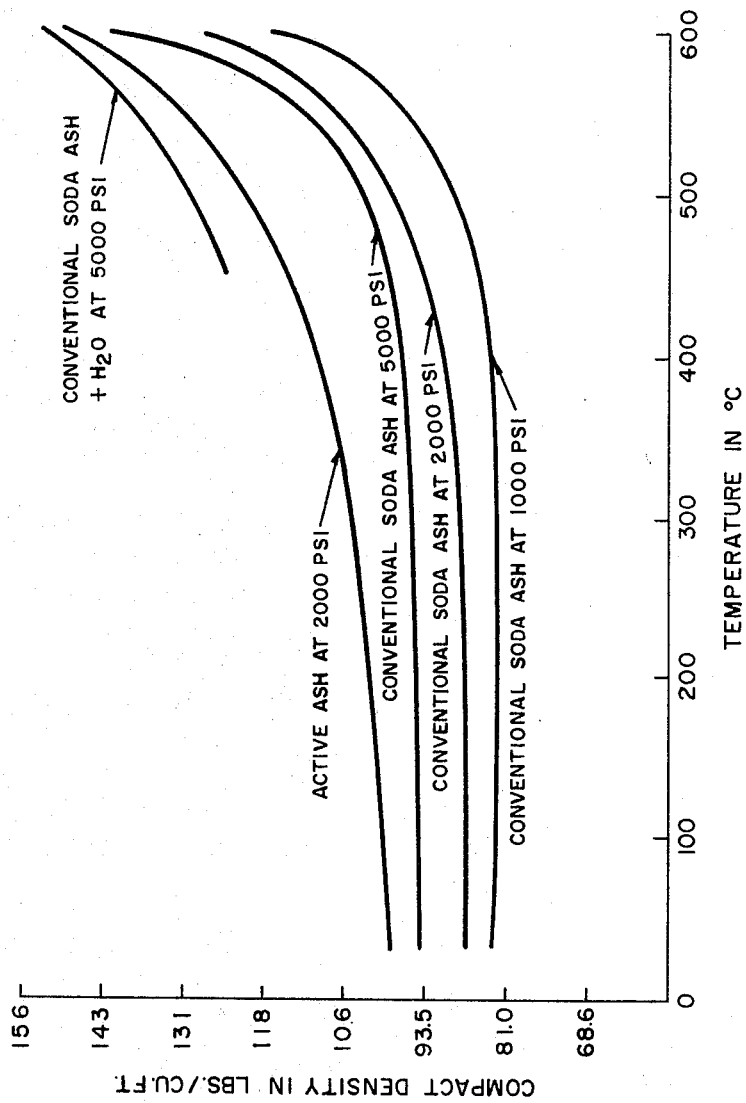

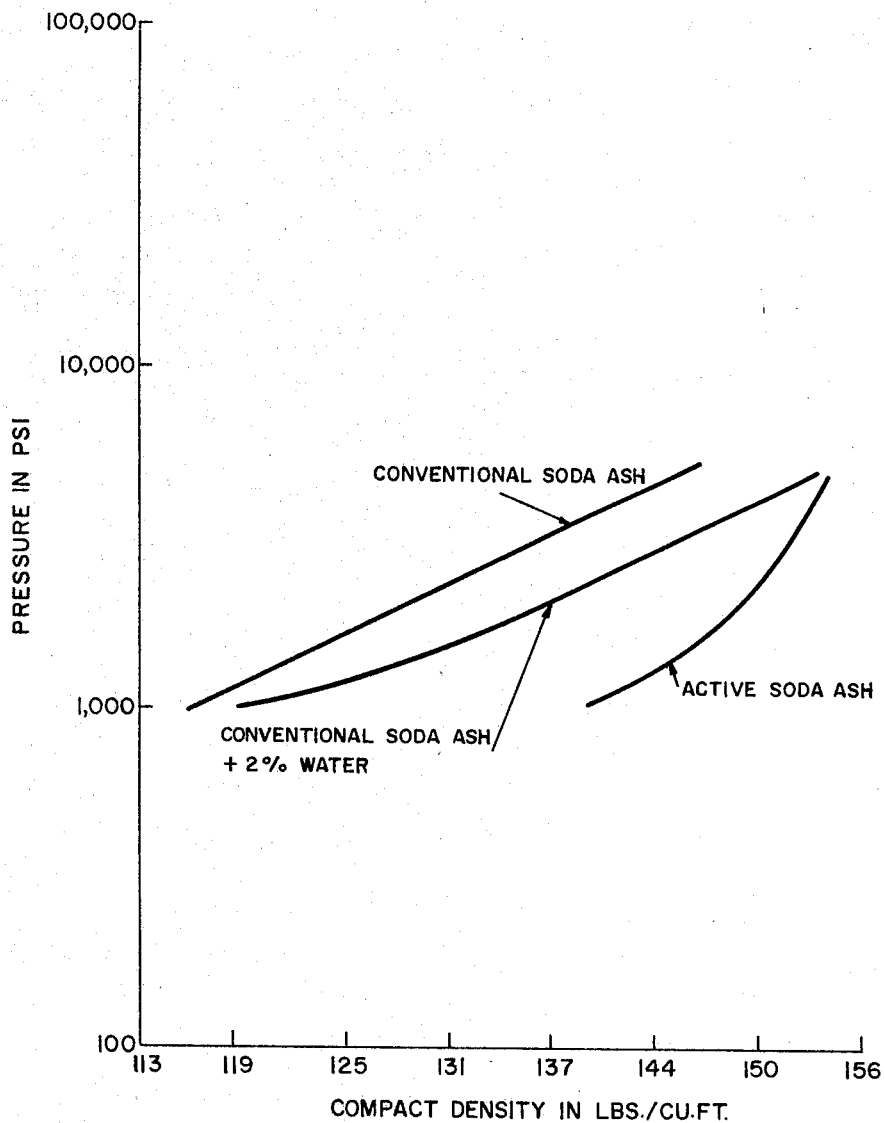

3,324,221
SODA ASH COMPACTION
Robert D. Hulse, Darien, Conn., and William F. Beck, Princeton Junction, N.J., assignors to FMC Corporation, New York, N.Y., a corporation of Delaware
Filed May 27, 1965, Ser. No. 459,373
7 Claims. (Cl. 264—332)

This invention relates to soda ash compacts having higher densities than have been obtainable, and to processes for compacting soda ash to produce such compacts.

Soda ash (anhydrous sodium carbonate) is desired in industry in a highly dense compact state to reduce transportation costs and to simplify handling and use. Transportation of soda ash is relatively expensive because conventional granular soda ash occupies no more than about 60 lbs./cu. ft. of cargo space. Since transporation costs are based on volume as well as weight of the item transported, a more dense ash is desirable to reduce these costs. Additionally, a compacted, dense form of soda ash is desired for use in a variety of furnace operations, for example desulfurizing iron in foundry furnaces. In such furnace applications, wherein a gas stream is passed through a furnace, only dense masses can be added directly to the furnace without being blown out in the gas stream.

Densification of soda ash can be achieved by densifying the individual granules of soda ash, thereby increasing the bulk density, and by compressing the granules of soda ash into solid blocks or compacts. The present application is concerned only with this latter densification technique so as to increase the overall bulk density of granular soda ash from less than 60 lbs./cu. ft. to compacts having densities of up to about 150 lbs./cu. ft.

In an effort to produce soda ash compacts prior workers have attempted to merely press conventional soda ash at room temperature under high pressures, i.e. on the order of about 50,000 p.s.i. However, this technique yields compacts which are readily subject to breakage on handling and shipping and whose density is not in excess of about 115 lbs./cu. ft.

Another technique which has been used to form compacts is to mix the granular soda ash with a binding agent and compress the resulting mixture. Binding agents which have been suggested for such use are polyethylene glycol (U.S. Patent 2,862,809), molasses (U.S. Patent 1,906,574) and other materials such as shredded wood, plastic or metal as set forth in German Patent 967,909, issued May 29, 1955. All of these processes suffer from the undesired contamination of the soda ash with the binder, particularly where extremely pure soda ash is required, e.g. as in glass making.

A further technique for making compacts is simply to fuse the soda ash and cast it into desired shapes. The drawback of this process is that the large heat requirements at high temperatures required are prohibitive for large scale production of soda ash compacts.

As a result there is a need for a method of producing pure soda ash compacts having high densities and good resistance to breakage, and which can be produced in a simple manner without fusion of the sodium carbonate.

It is an object of the present invention to satisfy the above needs by a process which produces high density soda ash compacts on a commercial scale, which are free of contaminants, which are resistant to normal breakage, and which can be produced without fusion of the soda ash.

It is a further object to produce soda ash compacts having high densities (preferably above about 125 lbs./cu. ft.) at relatively low compacting pressures.

These and other objects will be apparent from the following description.

We have found that sodium carbonate can be compressed into highly dense compact form by compressing the sodium carbonate (preferably under pressures of at least about 1,000 p.s.i.) while simultaneously maintaining the sodium carbonate at temperatures of from above about 450° C. to below the fusion temperature of soda ash during the compression.

In carrying out the present invention, granular soda ash having a mesh size of about +200 mesh may be used as the feed. The soda ash may be derived from any conventional process such as the classic Solvay process (in which an aqueous brine is reacted with carbon dioxide to form sodium bicarbonate crystals which are precipitated and calcined to soda ash), the sodium carbonate monohydrate process as described in U.S. Patent 2,962,348, or soda ash produced from sodium sesquicarbonate by the process described in U.S. Patent 2,346,140. In addition, the soda ash which may be employed can be "active soda ash" such as is produced by calcining precursor crystals capable of being calcined to soda ash in an atmosphere having reduced water vapor pressures, at temperatures of 85° C. to about 135° C. The process is set forth in our copending application Ser. No. 420,601 using sodium sesquicarbonate or sodium carbonate monohydrate as the precursor crystals. The "active soda ash" has small crystallites, predominantly small pores, and can be heat densified to a higher degree than conventional sodium carbonate.

The compacts are produced by compressing a suitable charge of the soda ash in a press or mold at temperatures of above about 450° C. but below the melting point of the soda ash. A suitable temperature range is from above about 450° to 750° C. The temperature of the soda ash during compression can be maintained in any suitable manner. For example, the soda ash may be heated to the required temperature, placed in the preheated mold or press and compressed under the required pressure. Alternately, a cooled soda ash charge can be pressed in a preheated press or mold and the sample compressed for a time sufficient to allow the charge to elevate to the temperatures of the mold. In this latter instance the charge is maintained under compression until its temperature reaches that of the heated press. The compression can be carried out at any pressures sufficient to yield hard, dense compacts. Pressures on the order of 1,000 to 10,000 p.s.i. are preferred. Pressures above about 10,000 p.s.i. can be employed but are not necessary to obtain high density, strong compacts particularly where temperatures of about 600° C. or above are employed.

In general the soda ash compact increases in density as either the pressure or temperature of compaction increases. Thus, for example, at pressures of about 1,000 p.s.i. a compact having a density of 118 lbs./cu. ft. can be obtained at compacting temperatures of about 600° C. When the pressure is increased to 2,000 p.s.i. at the same compacting temperature, the density of the soda ash compact increases to 128 lbs./cu. ft.

In this pressing operation it has been found that a small amount of water, on the order of up to about 5%, acts as a catalyst to increase the compact's density. For example, when conventional soda ash is compressed at 5,000 p.s.i. at 450° C., in the absence of water, a compact is obtained having a density on the order of about 100 lbs./cu. ft.; the same procedure carried out in the presence of 2% of water results in a compact having a density of 125 lbs./cu.ft.

In carrying out the instant invention "active soda ash" can be compressed to higher densities than conventional soda ash. Thus, for example, compaction of active ash at 2,000 p.s.i. at a temperature of 500° C. results in a compact having a density of 122 lbs./cu. ft.; compaction of normal soda ash under identical conditions results in a compact having a density of about 100 lbs./cu. ft.

This invention can best be illustrated by reference to the attached drawings.

In the drawings:

FIG. 1 illustrates in graphic form changes in density of the soda ash compacts at constant compacting pressure with changes in temperature, while FIG. 2 illustrates changes in density of the soda ash compacts with changes in compacting pressure at a constant compacting temperature.

The following examples are given to illustrate the present invention and are not deemed to be limiting thereof.

EXAMPLE 1

A series of runs were carried out for making soda ash compacts by compressing soda ash charges of from about 0.3 g. to about 5.8 g. in a modified hydraulic Carver press made by the Fred S. Carver Company. Two dies were used depending upon the pressure to be exerted and the size of the charge; one had a surface area of 0.151 square inch and the other an area of 0.995 square inch.

The soda ash samples used in these runs were of two types. One was conventional soda ash prepared by crystallizing sodium sesquicarbonate from trona and calcining the sodium sesquicarbonate to soda ash by the process described in U.S. Patent 2,346,140. The other was "active soda ash" derived from trona in which sodium sesquicarbonate crystals were calcined within a temperature of 85° to 135° C. in an atmosphere containing an ambient water vapor pressure below about 350 mm. of mercury. This process and product are more fully described in our copending application Ser. No. 420,601. In all cases the soda ash had a size of substantially +200 mesh before being compacted.

To form the compacts, the dies of the press were first heated to the temperature given in Table I. A charge of soda ash was placed between the dies and the compacting pressure given in Table I was applied for a period of 5 minutes while the dies were at the desired elevated temperature. Water was added as a binder during certain runs by adding 0.25 ml. of water to the initial charge; this amounted to 2% by weight of the soda ash compact. Density of the resulting compacts was measured by mercury displacement in an Aminco-Winslow Porosimeter.

The type of soda ash, pressure applied, temperature of the sample and resulting density are given in Table I.

TABLE I

| Starting Material | Pressure (p.s.i.) | Temperature (° C.) | Density (lbs./cu. ft.) |
|---|---|---|---|
| Conventional Soda Ash | 1,005 | 25 | 83.3 |
| | 2,009 | 25 | 87.8 |
| | 5,023 | 25 | 93.5 |
| | 1,005 | 433 | 83.3 |
| | 2,009 | 445 | 93.5 |
| | 5,023 | 445 | 98.5 |
| | 1,005 | 600 | 116 |
| | 2,009 | 600 | 129 |
| | 5,023 | 600 | 143 |
| | 5,023 | 600 | 147 |
| | 1,005 | 450 | 95.1 |
| | 2,009 | 450 | 97.0 |
| | 5,023 | 450 | 124 |
| | 5,023 | 450 | 125 |
| Conventional Soda Ash Water (2%). | 1,005 | 600 | 118 |
| | 2,009 | 600 | 140 |
| | 5,023 | 600 | 153 |
| Active Ash | 1,005 | 25 | 86.0 |
| | 2,009 | 25 | 99.4 |
| | 1,005 | 450 | 114 |
| | 2,009 | 450 | 115 |
| | 5,023 | 450 | 145 |
| | 1,005 | 600 | 112 |
| | 2,009 | 600 | 150 |

The results obtained in forming compacts are plotted in FIG. 1 and FIG. 2. In FIG. 1 the horizontal axis defines the pressure of compaction while the vertical axis defines the density of the resulting compacts. This figure illustrates the changes in density of the soda ash compacts at given constant compacting pressures with changes in temperature. As will be observed from FIG. 1, a marked increase in the density of the compact occurs at temperatures above about 450° C. This increase is shown at compacting pressures of 1,000, 2,000 and 5,000 p.s.i. FIG. 1 further illustrates that active ash can be compacted to much higher densities than conventional ash at the same pressures and temperatures.

In FIG. 2 the horizontal axis defines the density of the compact while the vertical axis defines the compacting pressure applied. In this figure all compression was carried out at 600° C. As will be observed from FIG. 2, active ash can be compressed into compacts of higher density than conventional soda ash. However, conventional soda ash can be compressed into compacts of higher density by using a catalytic amount of water during the compression.

Pursuant to the requirements of the patent statutes the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. Process for compressing soda ash into a highly dense compact which comprises compressing the soda ash under pressure sufficient to form a hard, dense compact while simultaneously maintaining the soda ash at a temperature of above about 450° C. but below the fusion temperature of the soda ash during the compression.

2. Process of claim 1 in which the compression is carried out at from about 1,000 p.s.i. to about 10,000 p.s.i.

3. Process of claim 1 in which the temperature of the soda ash during compression is from above about 450° C. to about 750° C.

4. Process of claim 1 in which the soda ash is active soda ash having smaller crystallites and predominantly smaller pores than conventional soda ash, said active ash being produced by calcining precursor crystals capable of being calcined to soda ash at a temperature of from 85° to 135° C. in an atmosphere containing low ambient water vapor pressures.

5. Process of claim 1 in which the soda ash which is compressed contains up to about 5% by weight of water.

6. Process for compressing soda ash into a highly dense compact which comprises compressing soda ash under pressures of from about 1,000 p.s.i. to about 5,000 p.s.i., while simultaneously maintaining the soda ash at temperatures of from above about 450° C. to about 750° C. during the compression and recovering a highly dense soda ash compact.

7. Process for compressing soda ash into a highly dense compact which comprises compressing soda ash containing up to about 5% by weight of water under pressures of from about 1,000 p.s.i. to about 5,000 p.s.i., while simultaneously maintaining the soda ash at temperatures of from above about 450° C. to about 750° C. during the compression and recovering a highly dense soda ash compact.

References Cited

UNITED STATES PATENTS

| | | | |
|---|---|---|---|
| 1,650,224 | 11/1927 | Sundstrom et al. | 23—302 |
| 1,906,574 | 5/1933 | Gleichert | 23—63 |

(Other references on following page)

| | | UNITED STATES PATENTS | | |
|---|---|---|---|---|
| 1,979,151 | 10/1934 | Frieke | 23—63 |
| 2,431,095 | 11/1947 | Tucker | 264—332 |
| 2,535,180 | 12/1950 | Watson | 264—332 |
| 2,862,809 | 12/1958 | Threlkeld | 75—55 |
| 2,862,887 | 12/1958 | Boyer | 23—302 |
| 3,116,137 | 12/1963 | Vasilos et al. | 264—332 |

NORMAN YUDKOFF, *Primary Examiner.*

G. HINES, *Assistant Examiner.*